Figure 1:
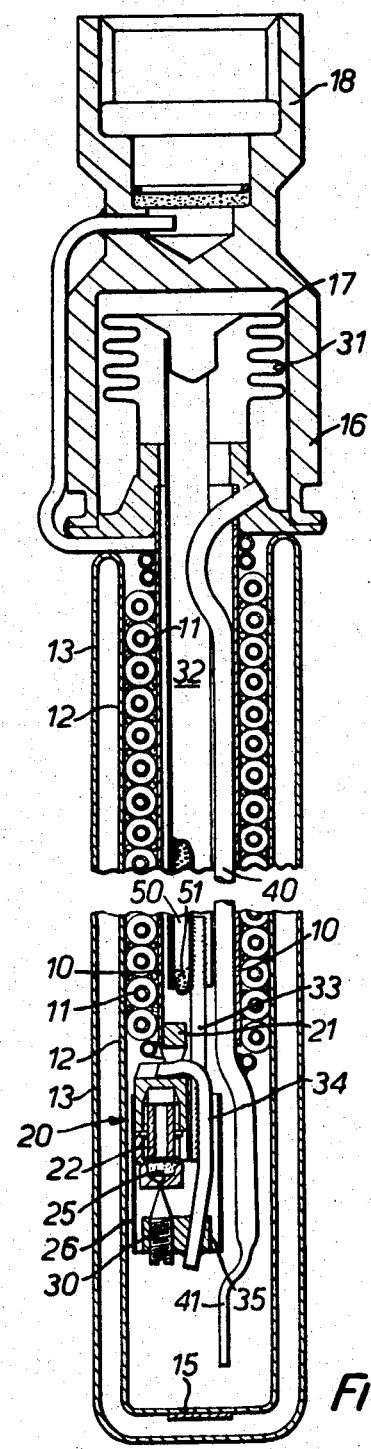

United States Patent [11] 3,630,047

| [72] | Inventor | Frank Arnold Turton<br>Cofton, England |
|---|---|---|
| [21] | Appl. No. | 21,602 |
| [22] | Filed | Mar. 23, 1970 |
| [45] | Patented | Dec. 28, 1971 |
| [73] | Assignee | The Hymatic Engineering Company Limited<br>Redditch, Worcestershire, England |
| [32] | Priority | Mar. 25, 1969 |
| [33] | | Great Britain |
| [31] | | 15,606/69 |

[54] CRYOGENIC COOLING APPARATUS
7 Claims, 2 Drawing Figs.
[52] U.S. Cl. .................................................. 62/514
[51] Int. Cl. .................................................... F25b 19/00
[50] Field of Search ....................................... 62/514

[56] References Cited
UNITED STATES PATENTS

| 3,320,755 | 5/1967 | Jepson | 62/514 |
|---|---|---|---|
| 3,457,730 | 7/1968 | Berry | 62/514 |
| 3,517,525 | 6/1970 | Campbell | 62/514 |

*Primary Examiner*—Meyer Perlin
*Attorney*—Watson, Cole, Grindle and Watson

ABSTRACT: A cryogenic cooling apparatus includes a generally tubular heat exchanger affording two paths through one of which refrigerant from a supply under pressure is supplied to a pressure reducing nozzle, whereupon the low-pressure refrigerant returns through the other path, and a valve member cooperating with the nozzle to vary its effective area for automatically controlling the flow of refrigerant. The valve is controlled by a bellows through a hollow piston rod extending through at least the cold end part of the heat exchanger, and the hollow piston rod forms or carries a damping chamber containing particulate material, such as phosphor bronze balls or tungsten carbide powder for damping out vibrations of the valve member.

PATENTED DEC 28 1971

3,630,047

INVENTOR
FRANK A. TURTON

BY
Watson, Cole, Grindle & Watson
ATTORNEY

CRYOGENIC COOLING APPARATUS

This invention relates to cryogenic cooling apparatus including a generally tubular heat exchanger affording two paths through one of which refrigerant from a supply under pressure is supplied to a pressure reducing nozzle, for example a Joule Thompson nozzle, whereupon the low pressure gas returns through the other path, and a valve member cooperating with the nozzle to vary its effective area for automatically controlling the flow of refrigerant.

It has been found that in some cases undesirable vibration of the valve may occur due to the elasticity of the means for controlling it and the flow of high pressure gas past it.

According to the present invention, for damping out such vibrations of the valve member, a damping chamber substantially filled with a loose particulate material is arranged to move with the valve member.

The valve may be controlled by a movable wall, for example the wall of a bellows, through a tube, which will be referred to as a hollow piston rod, extending through at least the cold end part of the heat exchanger, in which case the hollow piston rod may form or carry the damping chamber containing particulate material. The particulate material may comprise small balls, for example of metal such as phosphor bronze, or it may comprise powder, for example tungsten carbide powder.

It is frequently a requirement that cryogenic cooling apparatus of the kind referred to should be extremely compact, and an advantage of the invention, in its preferred form, is that the damping means occupies space not otherwise required and thus adds nothing to the bulk of the complete equipment, in addition to being quite inexpensive.

The cooling apparatus may be generally as described in U.S. be pivoted No. 3,517,525.

Figure 2:
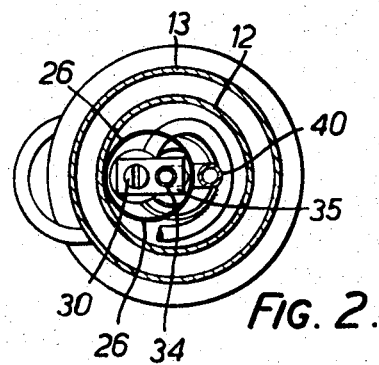

The invention may be put into practice in various ways but one specific embodiment will be described by way of example with reference to the accompanying drawings in which:

FIG. 1 is a sectional elevation of a cooling apparatus working on the Joule Thompson principle, and FIG. 2 is a sectional under plan view.

In the embodiment shown the cooling apparatus, like most of those of the specifications referred to above, is of elongated form, and it will be described in the position in which it would normally be used with its axis vertical and its cold end at the bottom.

The apparatus includes a tubular heat exchanger comprising an inner tubular body 10 around which is helically wound a finned inlet tube 11 forming the inlet path of the heat exchanger. An external coaxial tube 12, formed in this case by the inner wall of a Dewar flask having an outer wall 13, is located round the finned coil 11 and the space between the inner body and the external tube provides the second or exhaust path of the heat exchanger for exhaust gas flowing past the fins to cool the incoming high-pressure refrigerant within the helically coiled tube forming the inlet path. The lower end of the Dewar flask is closed to provide within it a reservoir in which the liquid working fluid can accumulate. A load to be cooled, such as an infrared radiation detector 15, is formed on or secured to the outer face of the inner wall 12 of the Dewar flask.

Secured to the end of the tubular body 10 is an upper body 16 the lower part of which affords a bellows chamber 17 while the upper part affords an inlet coupling 18. The upper end of the helical finned tube 11 communicates with the interior of the upper part of the upper body 16 to which gaseous refrigerant, such as nitrogen under pressure, is supplied at a temperature below its inversion temperature.

At its lower end the inner tubular body carries a seating member 20 in the form of a generally cylindrical hollow body 26 having at its upper end a crescent section lug 21 projecting from it eccentrically into the lower end of the tubular body 10 to which it is secured as by welding. The lower end of the finned tube 11 enters the seating member through one side and the latter contains a filter 22 through which the gas passes from the inlet tube 11 to an expansion orifice 25 formed in the bottom of the seating member 20.

The effective area of the expansion orifice is arranged to be controlled by means of a needle valve 30 which is itself controlled by a bellows 31, situated within the bellows chamber 17 referred to above, through a depending part-tubular or C-section member 32 that will be referred to as a piston rod. Welded to the lower end of the piston rod, near one edge, is the upper end of a straight rod 33 which in turn is welded at its lower end to a hooked rod 34, of which the lower end passes through and is welded to a block 35 into which the valve member 30 is adjustably screwed. The upper end of the hooked rod 34 projects laterally into a slot formed in the lug 21 of the seating member so as to form a stop to limit downward movement of the valve, and the needle valve 30 itself is adjusted so that in this lowermost position it just projects into the orifice 25 so as to center itself as it is raised to close the expansion nozzle.

The upper end of the piston rod 32 is secured to the closed upper end of the bellows 31 and the lower end of the latter is secured to the lower part of the bellows chamber 16. Accordingly if the pressure in the bellows chamber outside the bellows should fall, the bellows will expand, raising the piston rod and causing the valve 30 to enter further into the expansion nozzle so as to reduce its effective area and finally cut off flow through it.

A sensor tube 40, of which the lower end forms a sensor, extends the whole length of the heat exchanger within its inner tubular body alongside the hollow piston rod. At its upper end it passes through the bottom member of the bellows chamber 16 so that its interior communicates with the space round the bellows. The sensor tube extends down past the valve and has its lower end portion squashed flat to form an extended heat conducting tail 41. The sensor tube and the space outside the bellows inside the bellows chamber are filled with liquid and vapor, in equilibrium, of a suitable material, which may or may not be the same as the refrigerant.

Thus, in operation, as described in the U.S. Patent referred to above, as the liquid refrigerant collects in the outer vessel and the level of the pool of liquid gradually rises, progressively immersing the extended tail of the sensor, the temperature of the sensor tube progressively falls, the pressure applied to the outside of the bellows falls correspondingly, and the bellows expands, raising the hollow piston rod and causing the needle valve to progressively close the expansion orifice so as to reduce the flow of refrigerant.

The seating member 20 also carries, secured to it as by welding, a cylindrical shield surrounding the valve so that refrigerant issuing from the expansion nozzle cannot impinge directly on the sensor tube 40.

The arrangement described is suitable for applications where a construction of particular compactness and slenderness is required. Thus where the valve is actuated by a bellows situated within the heat exchanger (as in the U.S. Patent referred to above) it may be practicable to reduce the external diameter of the heat exchanger, that is to say the internal diameter of the Dewar flask, to about 7½ millimeters, but for certain applications this is still excessive, and a diameter of some 5 millimeters is required. This is achieved in accordance with the invention set forth in copending U.S. applications Ser. Nos. 21,603 and 21,601, filed Mar. 23, 1970 in which the bellows, instead of being inside the heat exchanger, is located coaxially with it beyond its warm end, and can be of considerably greater diameter than the heat exchanger.

In accordance with knurled present invention means is provided for damping oscillations of the valve. Thus under certain circumstances it has been found that objectionable oscillations of the valve can occur due to the spring-mass combination the bellows assembly oscillating under the excitation of the flow issuing from the expansion nozzle. In order to prevent such oscillations the piston rod carries a chamber 50 secured within it as by welding and substantially filled with a loose particulate material 51 such as small phosphor bronze balls or tungsten carbide powder. The cavity is filled as full as possible so as to obtain the maximum possible mass, but so that the filling is not packed but is free to move of its own accord. Thus if any oscillation should tend to occur the particulate mass can vibrate within the cavity out of phase with the hollow piston rod and thus damp out vibration.

Since it may not be easy to meter a small quantity of particulate material into such a minute cavity, it may be convenient to pelletize the material, using a binder such as solid carbon dioxide or ice, which is subsequently removed by evaporation.

It will be appreciated that the damping means employs space that would otherwise not be required and so adds nothing to the bulb of the apparatus.

The sensor tube 40 may be filled with any convenient volatile liquid in equilibrium with its vapor. Preferably however, in accordance with the invention set forth in the aforementioned copending U.S. application Ser. No. 21,603, the bellows is designed and placed so that when the pressure is the same inside and outside it contracts enough to open the valve to give a "fail-open" effect. A material is thus chosen to fill the bellows chamber which has a subatmospheric vapor pressure in the prevailing temperature range, which in the case of nitrogen as the refrigerant, might be about 85° to 110° K. Thus a suitable sensor material would be methane. Thus the pressure outside the bellows in the bellows chamber will be lower than the pressure in the remainder of the apparatus and hence inside the bellows, the valve being adjusted so that the resilience of the bellows tends to open it. In these circumstances if any leakage should occur and destroy the suction round the outside of the bellows the valve will fail open and cooling will continue. In other words in the event of such a failure the cooler will continue to function, although naturally the supply of refrigerant will be exhausted more rapidly than if it were functioning correctly.

As indicated above the arrangement having the bellows outside the heat exchanger has the advantage element, the size of the bellows is not limited to that of the Dewar flask, a point of particular importance where the valve is operated by suction.

It will be appreciated that the invention is not limited to the embodiment described by way of example and may be applied to a wide variety of constructions, for example those described in the prior specifications referred to above.

What we claim as our invention and desire to secure by Letters Patent is:

1. A cryogenic cooling apparatus comprising; a generally tubular heat exchanger affording two paths through one of which refrigerant from a supply under pressure is supplied to a pressure reducing nozzle, whereupon the low pressure refrigerant returns through the other path, a valve member cooperating with the nozzle to vary its effective area for automatically controlling the flow of refrigerant, and a damping chamber substantially filled with a loose particulate material arranged to move with said valve member for damping vibrations thereof.

2. A cooling apparatus as claimed in claim 1 further comprising a movable wall and a hollow piston rod interconnecting said movable wall and said valve member for controlling the latter, said piston rod extending through at least the cold end part of the heat exchanger and supporting said damping chamber containing particulate material.

3. A cooling apparatus as claimed in claim 2 in which the movable wall is the wall of a bellows.

4. A cooling apparatus as claimed in claim 1 in which said particulate material comprises small metal balls.

5. A cooling apparatus as in claim 4 wherein said metal balls are composed of phosphor bronze.

6. A cooling apparatus as claimed in claim 1 in which said particulate material comprises powder.

7. A cooling apparatus as in claim 5 wherein said powder is composed of tungsten carbide.

* * * * *